United States Patent
Hamaguchi

(10) Patent No.: US 9,432,535 B2
(45) Date of Patent: Aug. 30, 2016

(54) IMAGE READING APPARATUS

(71) Applicant: BROTHER KOGYO KABUSHIKI KAISHA, Nagoya-shi, Aichi-ken (JP)

(72) Inventor: Masanori Hamaguchi, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 15/054,288

(22) Filed: Feb. 26, 2016

(65) Prior Publication Data

US 2016/0182752 A1   Jun. 23, 2016

Related U.S. Application Data

(63) Continuation of application No. 14/664,476, filed on Mar. 20, 2015.

(30) Foreign Application Priority Data

Mar. 31, 2014   (JP) ................................. 2014-071993

(51) Int. Cl.
*H04N 1/04* (2006.01)
*H04N 1/00* (2006.01)

(52) U.S. Cl.
CPC ...... *H04N 1/00572* (2013.01); *H04N 1/00599* (2013.01); *H04N 1/00795* (2013.01); *H04N 1/00909* (2013.01); *H04N 1/00976* (2013.01); *H04N 2201/0094* (2013.01)

(58) Field of Classification Search
CPC ..................... H04N 1/00909; H04N 1/00976; H04N 1/00599; H04N 1/00572; H04N 2201/0094

USPC ................................ 358/1.12, 498, 497, 474
See application file for complete search history.

(56) References Cited

U.S. PATENT DOCUMENTS

| | | | | |
|---|---|---|---|---|
| 5,182,445 A | * | 1/1993 | Yamashita | ........... H04N 1/0314 250/208.1 |
| 7,079,294 B1 | | 7/2006 | Nakagawa et al. | |
| 2009/0027738 A1 | * | 1/2009 | Kim | ..................... H04N 1/1215 358/474 |
| 2011/0242622 A1 | | 10/2011 | Takeuchi et al. | |
| 2013/0003139 A1 | | 1/2013 | Osakabe | |

FOREIGN PATENT DOCUMENTS

| | | |
|---|---|---|
| JP | 3200125 B2 | 8/2001 |
| JP | 2002111964 A | 4/2002 |
| JP | 5126270 B2 | 1/2013 |

\* cited by examiner

*Primary Examiner* — Houshang Safaipour
(74) *Attorney, Agent, or Firm* — Merchant & Gould P.C.

(57) ABSTRACT

An image reading apparatus includes a conveyor configured to convey a sheet in a conveying direction along a conveyance path; a first reading unit configured to read an image of a first surface of the sheet conveyed by the conveyor through a first reading surface; a second reading unit configured to read an image of a second surface opposite to the first surface of the sheet conveyed by the conveyor through a second reading surface; a first pressing member, which is made of a resin, is configured to face the first reading surface and is configured to urge the sheet passing through the conveyance path towards the first reading surface; and a second pressing member, which is made of metal, is configured to face the second reading surface and configured to urge the sheet passing through the conveyance path towards the second reading surface.

9 Claims, 12 Drawing Sheets

IMAGE READING APPARATUS

CROSS-REFERENCE TO RELATED APPLICATION

This application is a continuation of U.S. patent application Ser. No. 14/664,476, filed Mar. 20, 2015, and further claims priority from Japanese Patent Application No. 2014-071993 filed on Mar. 31, 2014, the entire subject matter of both of which are incorporated herein by reference.

TECHNICAL FIELD

This disclosure relates to an image reading apparatus.

BACKGROUND

Conventionally, there is known an image reading apparatus including a conveyor, a first reading unit, a second reading unit, a first pressing member and a second pressing member.

The conveyor is configured to convey a sheet in a conveying direction along a conveyance path. The first reading unit is configured to read an image of a first surface of the sheet being conveyed by the conveyor, through a first reading surface along the conveyance path. The second reading unit is provided at a position downstream with respect to the first reading unit in the conveying direction. The second reading unit is configured to read an image of a second surface opposite to the first surface of the sheet being conveyed by the conveyor, through a second reading surface along the conveyance path.

The first pressing member is configured to face the first reading surface. The first pressing member is configured to form a conveyance path between the first pressing member and the first reading surface and to urge the sheet passing through the conveyance path towards the first reading surface. The second pressing member is configured to face the second reading surface. The second pressing member is configured to form a conveyance path between the second pressing member and the second reading surface and to urge the sheet passing through the conveyance path towards the second reading surface.

In the background image reading apparatus, the first pressing member and second pressing member made of metal are generally used. In this case, when the sheet being conveyed by the conveyor is contacted to the first pressing member and second pressing member made of metal, the sheet is easy to be neutralized.

On the other hand, in the background image reading apparatus of the related art, dusts such as paper dusts may be attached to the first reading surface or second reading surface. In this case, reading qualities of images by the first reading unit and the second reading unit are deteriorated. Therefore, the image reading apparatus is required to suppress the deterioration of the image reading qualities of the first reading unit and the second reading unit.

SUMMARY

This disclosure is to provide an image reading apparatus capable of suppressing deterioration of image reading qualities of a first reading unit and a second reading unit, which is caused due to dusts such as paper dusts, while suppressing a discharge failure of a sheet caused due to static electricity.

An image reading apparatus of this disclosure includes: a conveyor configured to convey a sheet in a conveying direction along a conveyance path; a first reading unit configured to read an image of a first surface of the sheet conveyed by the conveyor, through a first reading surface along the conveyance path; a second reading unit configured to read an image of a second surface opposite to the first surface of the sheet conveyed by the conveyor, through a second reading surface along the conveyance path, the second reading surface being provided at a position downstream from the first reading surface in the conveying direction; a first pressing member, which is made of a resin, is configured to face the first reading surface and to form the conveyance path between the first pressing member and the first reading surface and to urge the sheet passing through the conveyance path towards the first reading surface; and a second pressing member, which is made of metal, is configured to face the second reading surface and to form the conveyance path between the second pressing member and the second reading surface and to urge the sheet passing through the conveyance path towards the second reading surface.

According to the image reading apparatus, it is possible to suppress deterioration of image reading qualities of the first and second reading units, which is caused due to the dusts such as paper dusts, while suppressing a discharge failure of the sheet caused due to static electricity.

BRIEF DESCRIPTION OF THE DRAWINGS

The foregoing and additional features and characteristics of this disclosure will become more apparent from the following detailed descriptions considered with the reference to the accompanying drawings, wherein:

FIG. 3 is a perspective view of the image reading apparatus of the first illustrative embodiment, which illustrates an opening/closing unit located at an opened position, and the like;

FIG. 10 is an enlarged sectional view of main parts of the image reading apparatus of the first illustrative embodiment, which illustrates the first pressing member and the like;

FIG. 13 is an enlarged sectional view of main parts of the image reading apparatus of the second illustrative embodiment, which illustrates the first pressing member and the like.

DETAILED DESCRIPTION

Hereinafter, first and second illustrative embodiments of this disclosure will be described with reference to the drawings.

First Illustrative Embodiment

Figure 1:
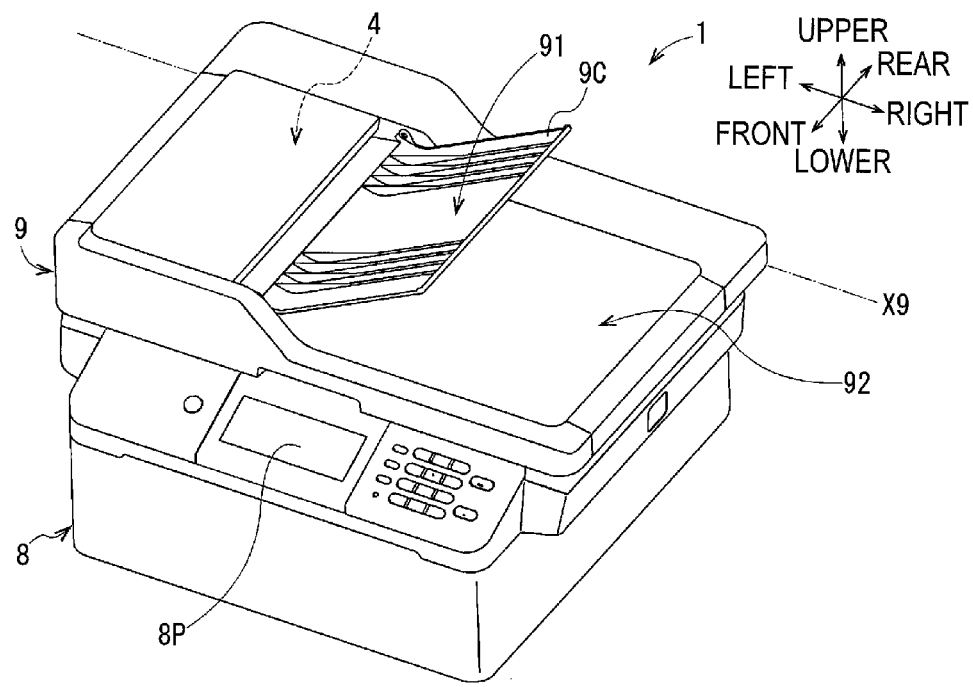
FIG. 1 is a perspective view of an image reading apparatus according to a first illustrative embodiment.

As shown in FIG. 1, an image reading apparatus 1 of a first illustrative embodiment is an example of a specific aspect of the image reading apparatus of this disclosure. In FIG. 1, a side at which an operation panel 8P is defined as a front side and a left side on the basis of the operation panel 8P is defined as a left side, so that respective directions of front, rear, left, right, upper and lower are indicated. The respective directions denoted in FIG. 2 and thereafter are indicated in correspondence to the respective directions denoted in FIG. 1. Hereinafter, the respective constitutional elements of the image reading apparatus 1 will be described on the basis of FIG. 1 and the like.

<Configurations>

As shown in FIGS. 1 to 4, the image reading apparatus 1 includes a main body unit 8, an opening/closing unit 9, an image forming unit 5, a reading unit 3 and a conveyor 4. The main body unit 8 is a substantially flat box-shaped member. As shown in FIG. 1, a front surface of the main body unit 8 is provided with the operation panel 8P such as a touch panel.

Figure 2:
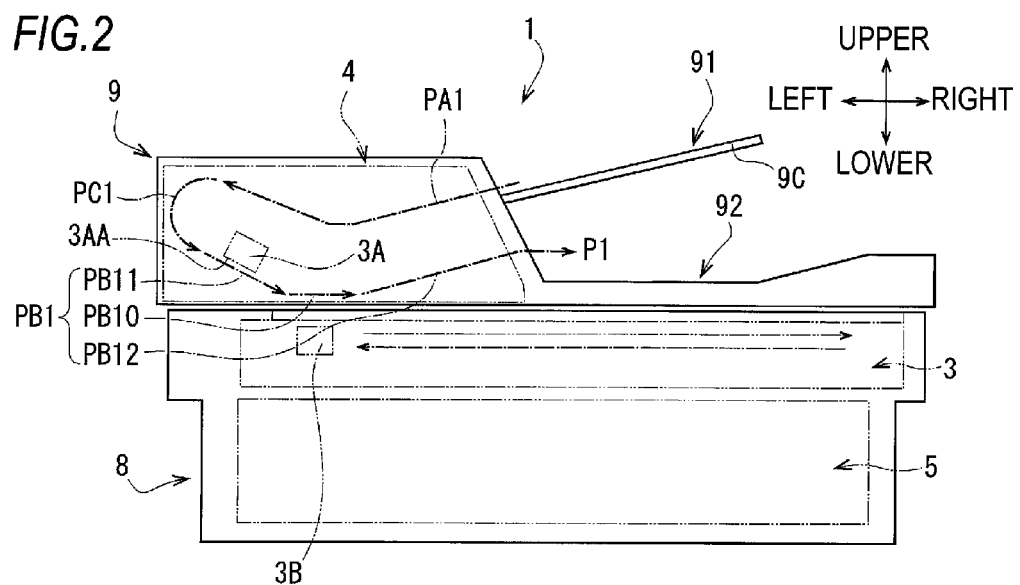
FIG. 2 is a pictorial front view of the image reading apparatus of the first illustrative embodiment.

As shown in FIG. 2, the reading unit 3 is positioned at an upper part in the main body unit 8. The image forming unit 5 is accommodated at a lower part in the main body unit 8. The image forming unit 5 is configured to form an image on a sheet by an inkjet or laser scheme.

Figure 3:
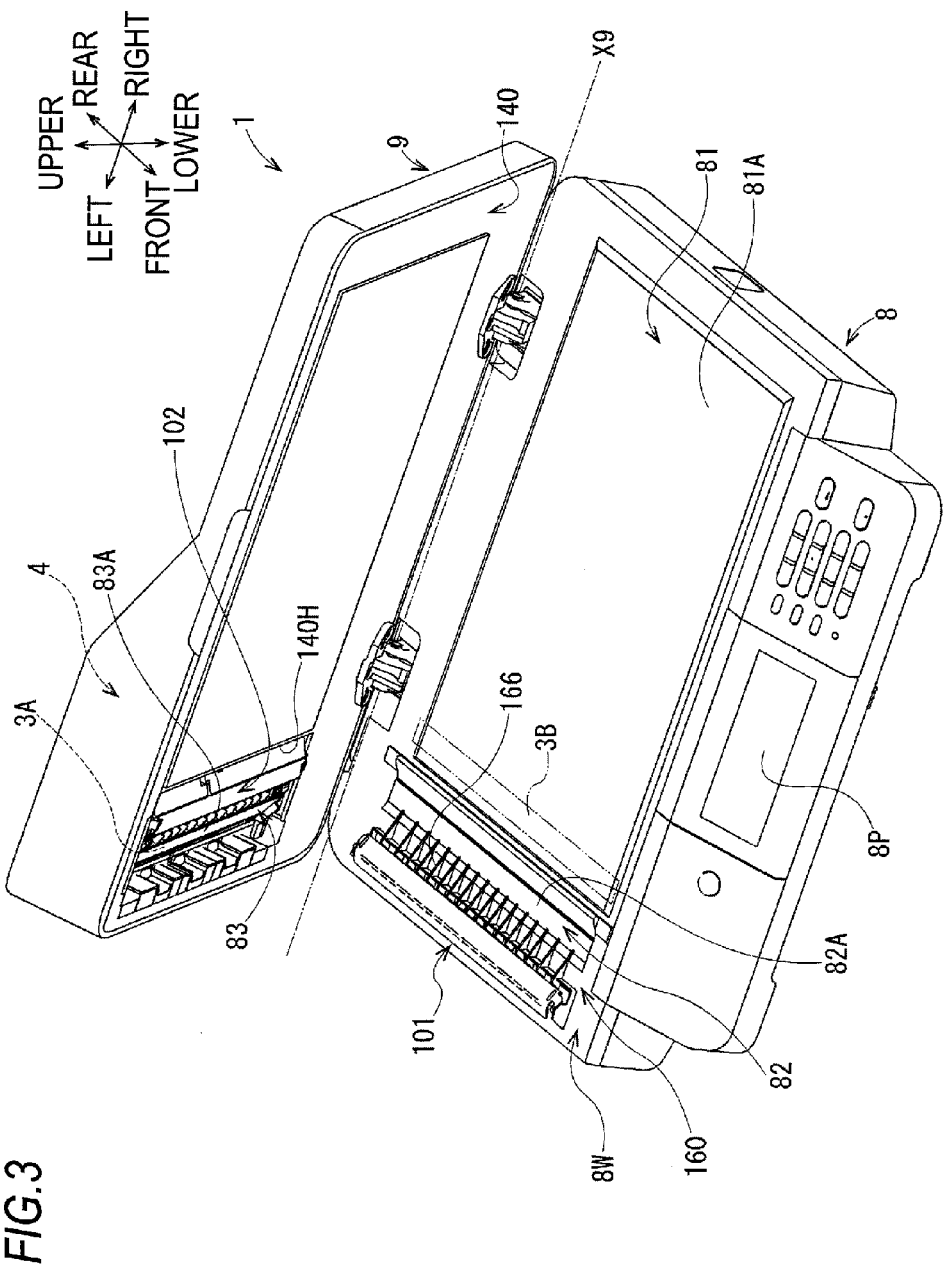

As shown in FIGS. 3 to 6, the reading unit 3 has a first platen glass 81, a second platen glass 82 and a frame member 8W. As shown in FIG. 3, the first platen glass 81 and the second platen glass 82 are arranged on an upper surface of the reading unit 3. The frame member 8W is configured to surround peripheral edges of the first platen glass 81 and second platen glass 82.

An upper surface of the first platen glass 81 configures a document support surface 81A. The document support surface 81A supports a stationary document from below when the reading unit 3 reads an image of the document. The document to be read includes a sheet such as an OHP sheet, a book and the like.

The second platen glass 82 is positioned at the left of the first platen glass 81 and is elongated in the front-rear direction. An upper surface of the second platen glass 82 configures a reading surface 82A. The reading surface 82A guides a sheet SH being conveyed from below when the reading unit 3 reads an image of the sheet SH being conveyed one by one by the conveyor 4. The reading surface 82A is an example of the 'second reading surface' of this disclosure.

The frame member 8W is a resin-molded product manufactured by an injection molding of a thermoplastic resin, and the like. A part of the frame member 8W positioned at the left of the second platen glass 82 is provided with a guide part 160, which will be described later.

As shown in FIG. 1, the opening/closing unit 9 is supported to be rotatable around an opening/closing shaft center X9 extending in the left-right direction by hinges (not shown) arranged at a rear-side upper portion of the main body unit 8. The opening/closing unit 9 is movable between an open position and a closed position. At the closed position shown in FIGS. 1, 2, 4 and 5, the opening/closing unit 9 is configured to cover the document support surface 81A from above. The opening/closing unit 9 is rotated around the opening/closing shaft center X9 so that a front end portion-side thereof is displaced upward and rearward. Thereby, the opening/closing unit 9 is displaced to the opened position shown in FIGS. 3 and 7. At the opened position, the opening/closing unit 9 is configured to expose the document support surface 81A. Thereby, a user can make the document support surface 81A support a document which is a read target.

As shown in FIGS. 2 to 5, the reading unit 3 includes a reading sensor 3B and a scanning mechanism (not shown), which are accommodated at an upper part in the main body unit 8, and a reading sensor 3A, which is accommodated in the opening/closing unit 9.

The reading sensor 3A is an example of the 'first reading unit' of this disclosure. The reading sensor 3B is an example of the 'second reading unit' of this disclosure. As the reading sensors 3A, 3B, well-known image reading sensors such as a CIS (Contact Image Sensor) and a CCD (Charge Coupled Device) are used. As shown in FIG. 3, the reading sensor 3B extends in the front-rear direction and is provided on its upper surface with a plurality of light receiving devices (not shown) in a line.

Figure 4:
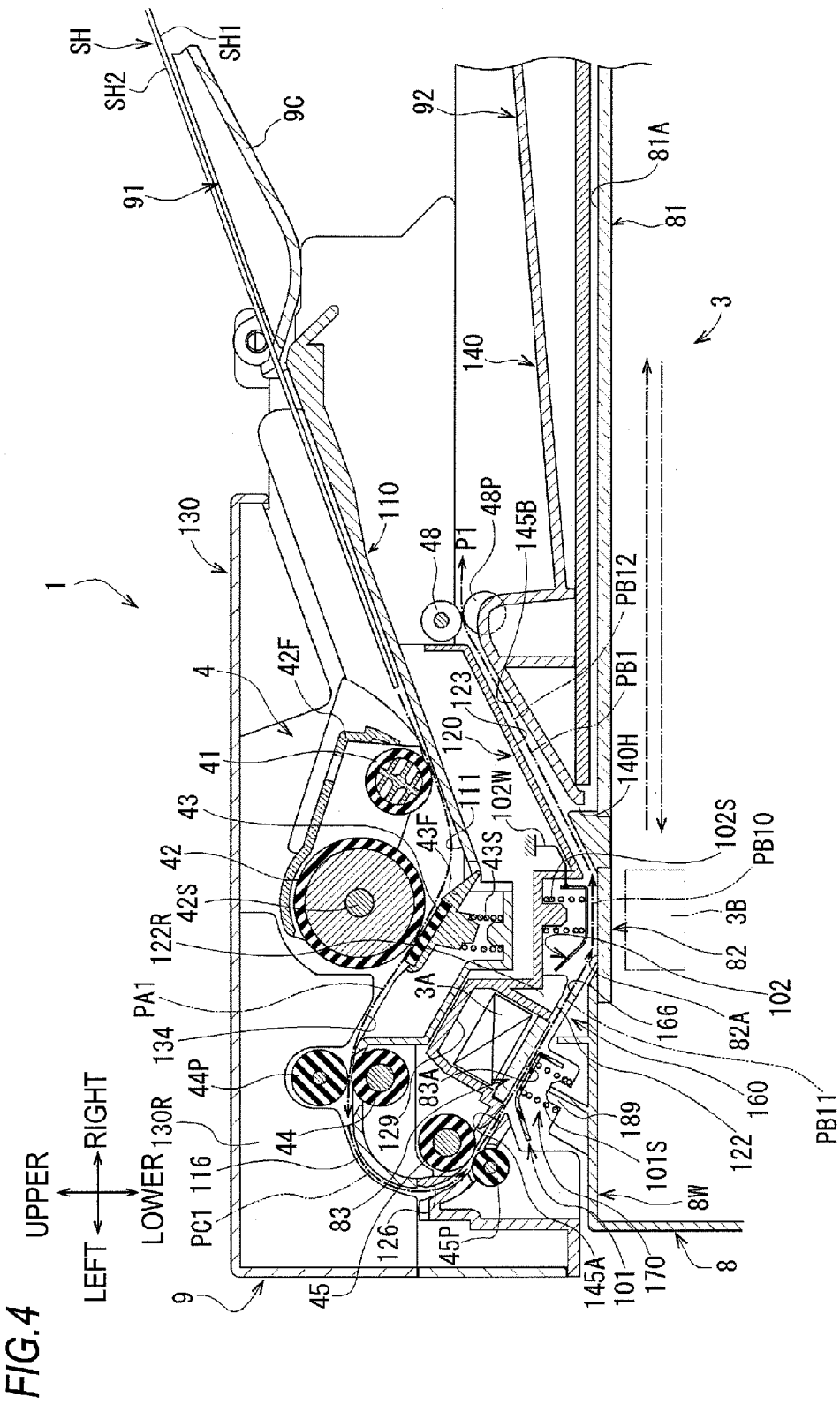
FIG. 4 is a pictorial partial sectional view of the image reading apparatus of the first illustrative embodiment.
Figure 5:
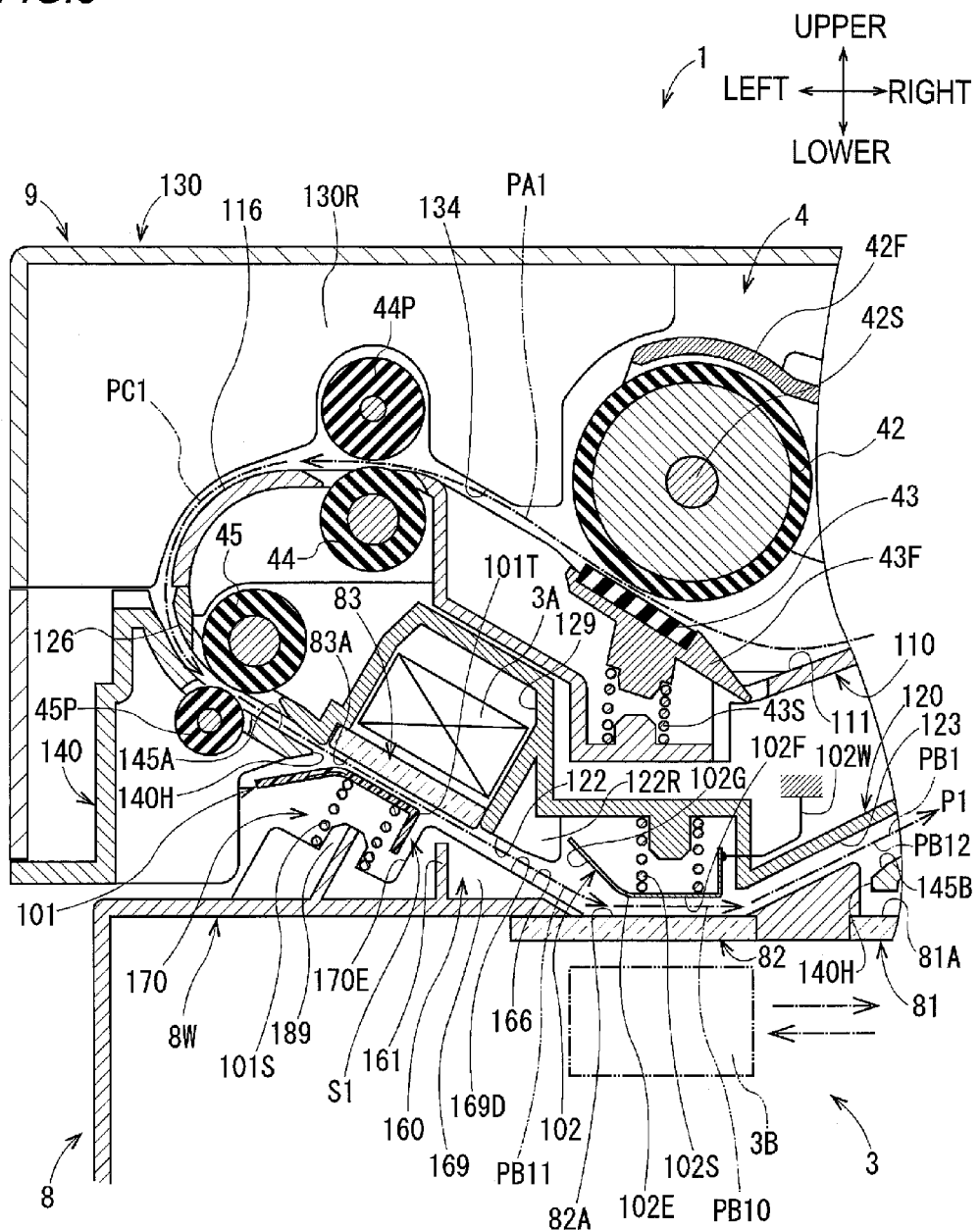
FIG. 5 is a pictorial partial sectional view of the image reading apparatus of the first illustrative embodiment.

As shown in FIGS. 3 to 5, the reading sensor 3B is located below the document support surface 81A and the reading surface 82A movably. The scanning mechanism (not shown) reciprocally moves the reading sensor 3B in the left-right direction below the document support surface 81A in the main body unit 8 when reading an image of a document supported on the document support surface 81A. Also, the scanning mechanism (not shown) stops the reading sensor 3B at a predetermined reading position below the reading surface 82A in the main body unit 8 when the reading sensor 3B reads an image of the sheet SH being conveyed by the conveyor 4.

As described later, the reading sensor 3A is arranged on a conveyance path P1 in the opening/closing unit 9. As shown in FIG. 5, the reading sensor 3A is configured to face the conveyance path P1 with a third platen glass 83 being interposed therebetween. Similarly to the reading sensor 3B, the reading sensor 3A extends in the front-rear direction. When the image of the sheet SH being conveyed by the conveyor 4 is read by the reading sensor 3A, a reading surface 83A of the third platen glass 83 guides the sheet SH from above. The reading surface 83A is an example of the 'first reading surface' of this disclosure.

As shown in FIGS. 2, 4 and 5, the conveyor 4 is provided in the opening/closing unit 9. The conveyor 4 includes a feeder tray 91 and a discharge tray 92. As shown in FIGS. 1 and 2, the feeder tray 91 is formed at a right part of the opening/closing unit 9 by opening a cover 9C openably and closably supported on an upper surface of the opening/closing unit 9. The discharge tray 92 is located below the feeder tray 91.

As shown in FIG. 4, the feeder tray 91 is configured to support the sheet SH, which is being conveyed by the conveyor 4 and is a reading target, from below. A lower surface of the sheet SH supported on the feeder tray 91 is referred to as a first surface SH1. An upper surface of the sheet SH supported on the feeder tray 91, i.e., an opposite surface to the first surface SH1 is referred to as a second surface SH2. The sheet SH of which images have been read by the reading sensors 3A, 3B and conveyed by the conveyor 4 is discharged to the discharge tray 92. When the sheet SH is discharged to the discharge tray 92, the first surface SH1 faces upwardly and the second surface SH2 faces downwardly.

As shown in FIGS. 4 and 5, the conveyor 4 includes a first chute member 110, a second chute member 120, a first cover member 130, a second cover member 140, a first pressing member 101 and a second pressing member 102. The conveyor 4 is configured by the first chute member 110, the second chute member 120, the first cover member 130 and the second cover member 140. Specifically, a space surrounded by a plurality of guide surfaces provided for the respective members and extending to be able to abut on the first surface SH1 or second surface SH2 of the sheet SH in the opening/closing unit 9, a plurality of rollers (which will be described later), the first pressing member 101, the second pressing member 102 and the like defines the conveyance path P1 shown in FIGS. 2, 4 and 5. The conveyance path P1 includes an upper path PA1, a lower path PB1 and a curved path PC1.

The upper path PA1 extends from the feeder tray 91 toward a left end portion of the opening/closing unit 9. The upper path PA1 is inclined downwardly at a part thereof continuing to the feeder tray 91 and is then inclined upwardly from a position between a supply roller 41 and a separation roller 42.

The lower path PB1 is positioned below the upper path PA1. The lower path PB1 extends from the left end portion of the opening/closing unit 9 toward the discharge tray 92. The lower path PB1 is inclined downwardly to come close to the reading surface 82A from the left end portion of the opening/closing unit 9, extends rightward with being substantially horizontal along the reading surface 82A and is then inclined upwardly towards the discharge tray 92.

The curved path PC1 is curved with bulging leftward and connects a left end of the upper path PA1 with a left end of the lower path PB1.

The lower path PB1 includes a first inclined part PB11 and a second inclined part PB12 with a reference part PB10 extending rightward with being substantially horizontal along the reading surface 82A, i.e., a predetermined part positioned below the curved path PC1.

The first inclined part PB11 of the lower path PB1 is a part inclined downwardly to come close to the reading surface 82A from the left end portion of the opening/closing unit 9, i.e., a part inclined downwardly from the curved path PC1 towards the reference part PB10.

The second inclined part PB12 of the lower path PB1 is a part inclined upwardly from the reading surface 82A towards the discharge tray 92, i.e., a part inclined upwardly from the reference part PB10 towards an opposite side to the curved path PC1.

The conveyor 4 is configured to convey the sheet SH from the upper path PA1 to the lower path PB1 via the curved path PC1 on the conveyance path P1. A conveying direction of the sheet SH on the conveyance path P1 is a leftward direction on the upper path PA1, is changed from the leftward direction to a rightward direction on the curved path PC1 and is a rightward direction on the lower path PB1. On the conveyance path P1, a right end of the upper path PA1 is an upstream side in the conveying direction, and a right end of the lower path PB1 is a downstream side in the conveying direction.

Configurations of the first chute member 110, the second chute member 120, the first cover member 130 and the second cover member 140 defining the conveyance path P1 are described in detail.

As shown in FIGS. 4 and 5, each of the first chute member 110, the second chute member 120, the first cover member 130 and the second cover member 140 is a resin-molded product manufactured by an injection molding of a thermoplastic resin, for example.

The first chute member 110 extends in the front-rear and left-right directions. A right part of an upper surface of the first chute member 110 is connected to a left end edge of an upper surface of the opened cover 9C and is inclined leftward and downward, and a left part of the upper surface of the first chute member 110 is inclined leftward and upward to the left end portion of the opening/closing unit 9. The first chute member 110 forms a first guide surface 111 defining the upper path PA1 by the upper surface thereof. The first guide surface 111 extends to be able to abut on the first surface SH1 of the sheet SH being conveyed along the upper path PA1 and guides the sheet SH from below on the upper path PA1.

A left end portion of the first chute member 110 is formed with an upper curved surface 116 curved to form an arc, a direction of which is changing from the leftward direction to the downward direction. The upper curved surface 116 defines an upper part of the curved path PC1. The upper curved surface 116 extends to be able to abut on the first surface SH1 of the sheet SH being conveyed along the upper part of the curved path PC1 and guides the sheet SH from below and right on the upper part of the curved path PC1.

The second chute member 120 extends in the front-rear and left-right directions. The second chute member 120 is mounted to the first chute member 110 from below. A left end portion of the second chute member 120 is formed with a lower curved surface 126 curved to form an arc, a direction of which is changing from the downward direction to the rightward direction. The lower curved surface 126 defines a lower part of the curved path PC1. The lower curved surface 126 extends to be able to abut on the first surface SH1 of the sheet SH being conveyed along the lower part of the curved path PC1 and guides the sheet SH from right and above on the lower part of the curved path PC1.

Figure 7:
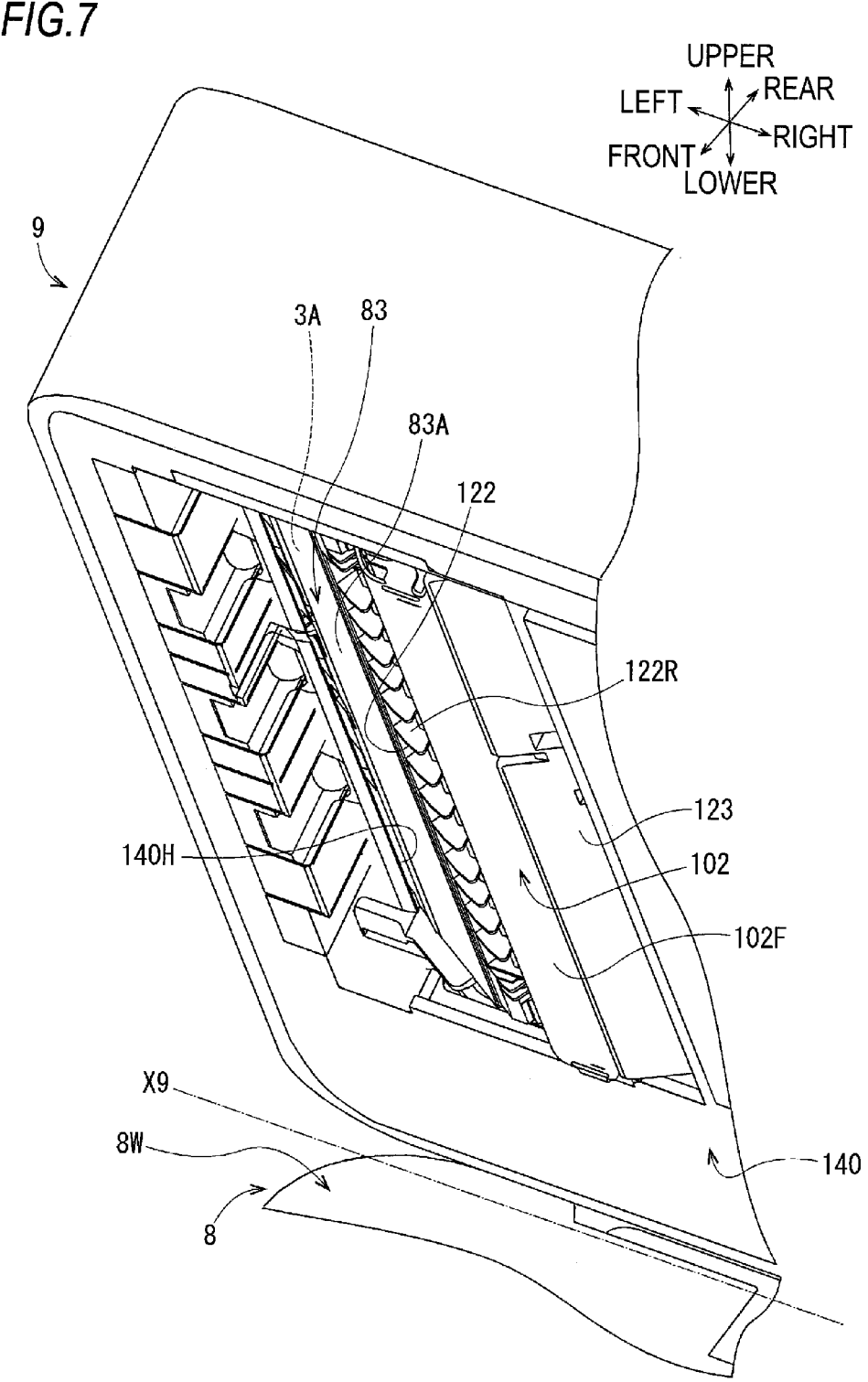
FIG. 7 is a partial enlarged perspective view of the image reading apparatus of the first illustrative embodiment, which illustrates a periphery of a first reading unit at the opening/closing unit shown in FIG. 3.

As shown in FIGS. 4, 5 and 7, a lower surface of the second chute member 120 connects to the lower curved surface 126 and is inclined rightward and downward. The second chute member 120 is configured to form a second guide surface 122 defining the first inclined part PB11 of the lower path PB1 by the lower surface thereof. The second guide surface 122 extends to be able to abut on the first surface SH1 of the sheet SH being conveyed along the first inclined part PB11 and guides the sheet SH from above on the first inclined part PB11.

As shown in FIGS. 4 and 5, the second chute member 120 has a reading sensor holding part 129. The reading sensor holding part 129 is recessed upward and rightward from the second guide surface 122, i.e., towards the upper path PA1. The reading sensor holding part 129 is configured to hold therein the reading sensor 3A. The reading sensor holding part 129 is blocked by the third platen glass 83.

The reading surface 83A of the third platen glass 83 is inclined rightward and downward along the first inclined part PB11. The reading surface 83A defines the first inclined part PB11 from above, together with the second guide surface 122. The reading sensor 3A is located above the lower path PB1. A reading surface 3AA of the reading sensor 3A is parallel with the reading surface 83A of the third platen glass 83, i.e., is arranged obliquely downward along the first inclined part PB11.

The reading surface 3AA of the reading sensor 3A is configured to face the first inclined part PB11 with the reading surface 83A of the third platen glass 83 being interposed therebetween. As shown in FIG. 7, a part of the second guide surface 122 positioned at a downstream side with respect to the reading surface 83A of the third platen glass 83 in the conveying direction is configured by lower end edges of a plurality of ribs 122R.

As shown in FIGS. 4, 5 and 7, the second pressing member 102 is held on the lower surface of the second chute member 120. The second pressing member 102 is located at a position adjacent to the right of the second guide surface 122 and is configured to face the reading surface 82A from above.

The second pressing member 102 is made of metal. As the metal material configuring the second pressing member 102, the general metal such as iron, aluminum, copper and the like may be used. In this illustrative embodiment, the second pressing member 102 is made by performing punching processing, bending processing and the like for a stainless thin plate. As shown in FIG. 5, the second pressing member 102 is grounded via an earth wiring 102W.

The second pressing member 102 extends in the front-rear direction. The second pressing member 102 has a flat surface 102F and an inclined surface 102G. The flat surface 102F is configured to face the reading surface 82A from above. The inclined surface 102G connects to an upstream end edge 102E of the flat surface 102F in the conveying direction. The inclined surface 102G is inclined so that it is more separated upwardly from the conveyance path P1 as it proceeds leftward, i.e., upstream in the conveying direction.

As shown in FIG. 5, a compression coil spring 102S is arranged between the second chute member 120 and the second pressing member 102. The compression coil spring 102S is configured to urge the second pressing member 102 towards the reading surface 82A.

The flat surface 102F and the inclined surface 102G of the second pressing member 102 define the reference part PB10 of the lower path PB1 from above. The flat surface 102F and the inclined surface 102G of the second pressing member 102 extend to be able to abut on the first surface SH1 of the sheet SH being conveyed along the reference part PB10 and are configured to guide the sheet SH on the reference part PB10 with urging the sheet SH from above towards the reading surface 82A.

As shown in FIGS. 4, 5 and 7, the lower surface of the second chute member 120 is inclined rightward and upward from a position adjacent to the right of the flat surface 102F of the second pressing member 102. The second chute member 120 is configured to form a third guide surface 123 defining the second inclined part PB12 of the lower path PB1 by the lower surface thereof. The third guide surface 123 extends to be able to abut on the first surface SH1 of the sheet SH being conveyed along the second inclined part PB12 and guides the sheet SH from above on the second inclined part PB12.

As shown in FIGS. 4 and 5, the first cover member 130 is mounted to the first chute member 110 from above. The first cover member 130 extends in the front-rear and left-right directions, thereby covering the first chute member 110.

A lower surface of the first cover member 130 is formed with a plurality of ribs 130R. Although not shown, the respective ribs 130R are arranged with having an interval in the front-rear direction and extend in the left-right direction. A lower end edge of each rib 130R extends in the left-right direction along the first guide surface 111 with having a gap from the first guide surface 111 of the first chute member 110. The lower end edge of each rib 130R is curved to form an arc, a direction of which is changing from the leftward direction to the downward direction, with having a gap from the upper curved surface 116 of the first chute member 110.

The first cover member 130 is configured to form fourth guide surfaces 134 by the lower end edges of the respective ribs 130R. The fourth guide surfaces 134 define the upper parts of the upper path PA1 and curved path PC1. The fourth guide surfaces 134 extend to be able to abut on the second surface SH2 of the sheet SH being conveyed along the upper parts of the upper path PA1 and curved path PC1 and guide the sheet SH from above and left on the upper parts of the upper path PA1 and curved path PC1.

As shown in FIGS. 3 to 5 and 7, the second cover member 140 is mounted to the first chute member 110 and second chute member 120 from below. The second cover member 140 extends in the front-rear and left-right directions. As shown in FIG. 3, the lower surface of the opening/closing unit 9 is formed by the lower surface of the second cover member 140. As shown in FIG. 4, an upper surface of a right part of the second cover member 140 is configured as the discharge tray 92.

Figure 8:
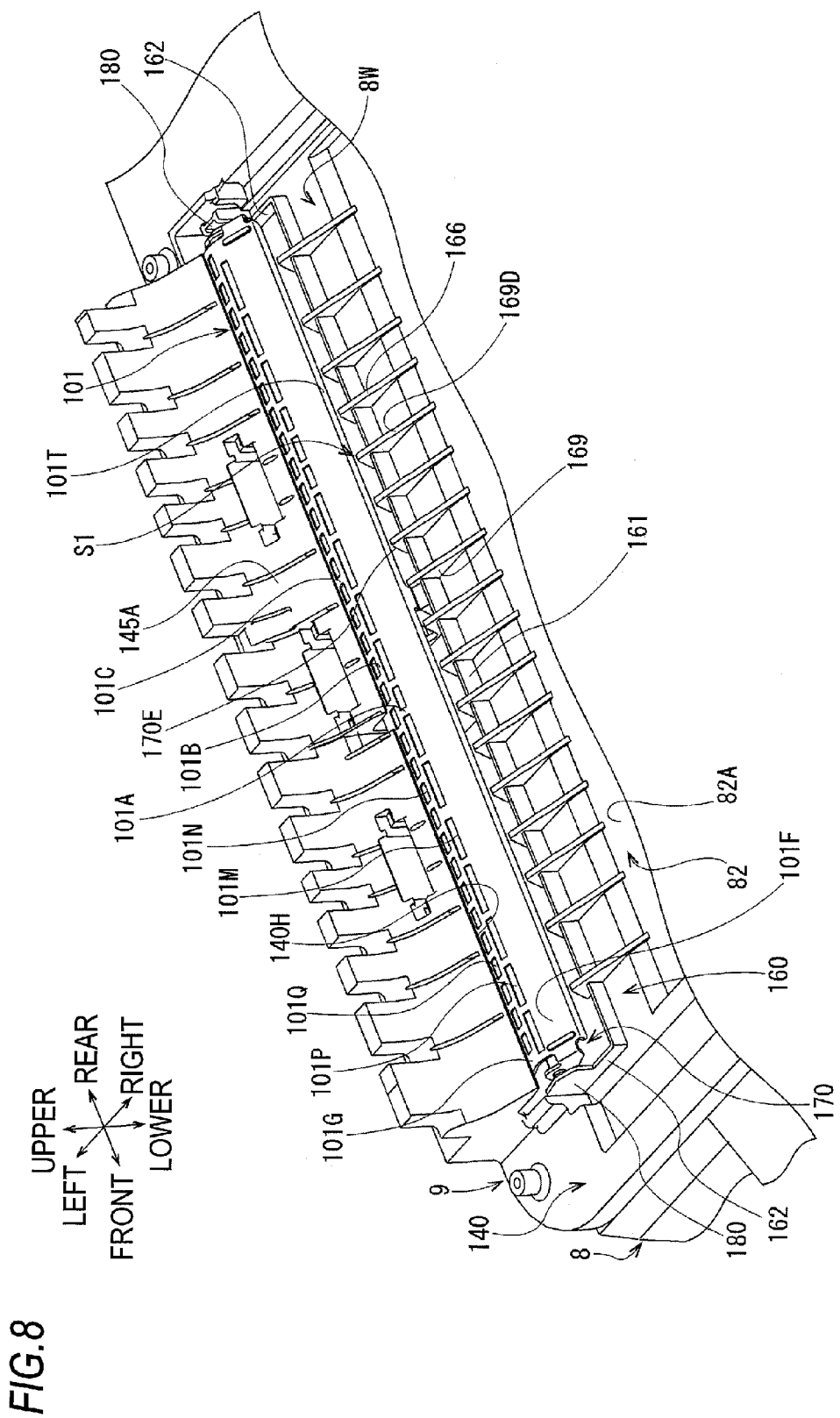
FIG. 8 is a partial perspective view of the image reading apparatus of the first illustrative embodiment, which illustrates a relative relation between a lower curved surface, which defines a curved path from below at the opening/closing unit, and the first pressing member.

As shown in FIGS. 3 to 5, 7 and 8, a left part of the second cover member 140 is formed with a rectangular opening 140H elongated in the front-rear direction and penetrated therethrough. FIG. 8 illustrates only the second cover member 140 of the opening/closing unit 9 located at the closed position, so that a relative positional relation between the opening 140H and the like of the second cover member 140 and the frame member 8W and the like of the main body unit 8 is shown.

As shown in FIGS. 4, 5 and 8, the opening 140H is positioned just above the reading surface 82A and enables the reading surface 82A and the second pressing member 102 to face each other at the state where the opening/closing unit 9 is located at the closed position. Thereby, the reading surface 82A defines the reference part PB10 of the lower path PB1 from below. The reading surface 82A extends to be able to abut on the second surface SH2 of the sheet SH being conveyed along the reference part PB10 and guides the sheet SH from below on the reference part PB10.

As shown in FIG. 7, the opening 140H is configured to expose the second guide surface 122 of the second chute member 120, the reading surface 83A of the third platen glass 83 and the second pressing member 102 at the state where the opening/closing unit 9 is located at the opened position. That is, the first inclined part PB11 and the reference part PB10 are opened by the opening 140H at the state where the opening/closing unit 9 is located at the opened position.

As shown in FIGS. 4, 5 and 8, a part of the second cover member 140 positioned at the left of the opening 140H is formed with a fifth guide surface 145A. The fifth guide surface 145A is curved to form an arc, a direction of which is changing from the downward direction to the rightward direction, and reaches the opening 140H, with having a gap from the lower curved surface 126 of the second chute member 120.

The fifth guide surface 145A defines the lower part of the curved path PC1. The fifth guide surface 145A extends to be able to abut on the second surface SH2 of the sheet SH being conveyed along the lower part of the curved path PC1 and guides the sheet SH from left and below on the lower part of the curved path PC1 and the first inclined part PB11 of the lower path PB1.

As shown in FIG. 4, a part of the second cover member 140 positioned at the right of the opening 140H is formed with a fifth guide surface 145B. The fifth guide surface 145B reaches the discharge tray 92 with being inclined rightward and upward with having a gap from the third guide surface 123 of the second chute member 120.

The fifth guide surface 145B defines the second inclined part PB12 of the lower path PB1 from below. The fifth guide surface 145B extends to be able to abut on the second surface SH2 of the sheet SH being conveyed along the second inclined part PB12 of the lower path PB1 and guides the sheet SH from below on the second inclined part PB12 of the lower path PB1.

As shown in FIGS. 3 to 6 and 8 to 11, the frame member 8W of the main body unit 8 is provided with the guide part 160 and the first pressing member 101. The first pressing member 101 extends in the front-rear direction. The front-rear direction in which the first pressing member 101 extends is an example of the 'longitudinal direction of the first pressing member' of this disclosure.

Figure 6:
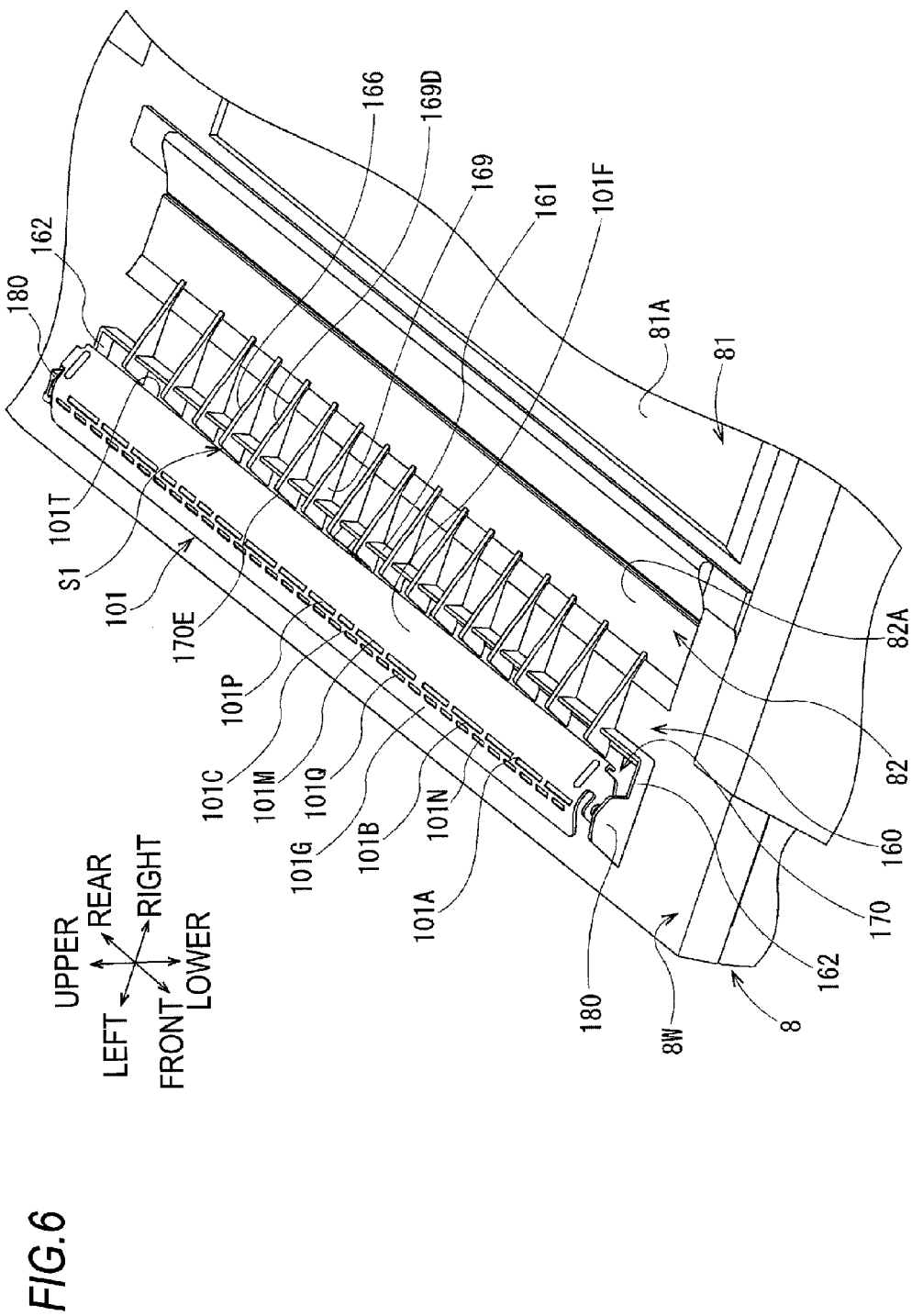
FIG. 6 is a partial enlarged perspective view of the image reading apparatus of the first illustrative embodiment, which illustrates a periphery of a guide part and a first pressing member at a main body unit shown in FIG. 3.
Figure 11:
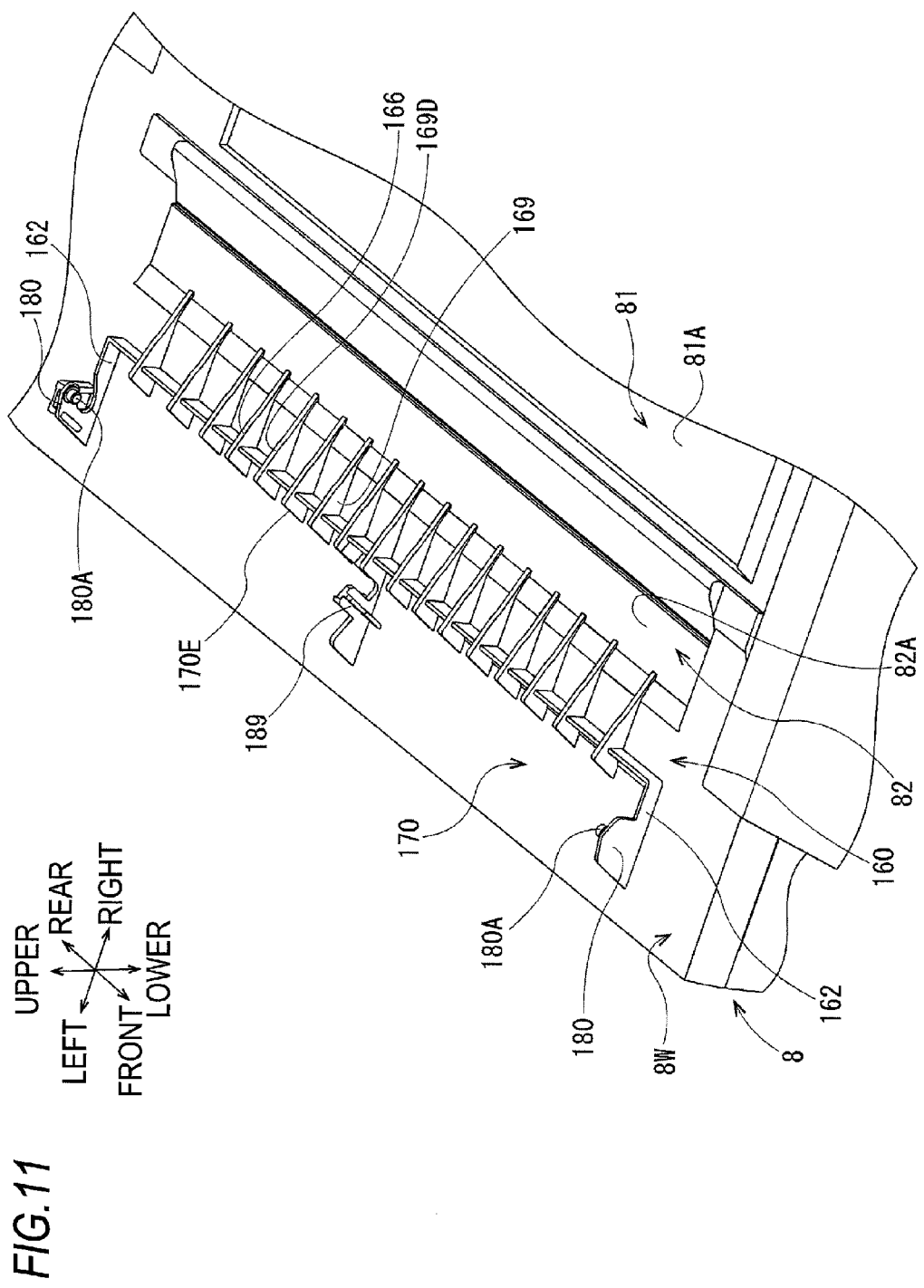
FIG. 11 is a partial perspective view of the image reading apparatus of the first illustrative embodiment, which illustrates a state where the first pressing member is omitted from FIG. 6.

As shown in FIGS. 5, 6 and 11, for example, the guide part 160 is formed integrally with the frame member 8W made of resin so that it protrudes upwardly from a part of the frame member 8W positioned at the left of the second platen glass 82 beyond the document support surface 81A and reading surface 82A of the main body unit 8.

More specifically, the guide part 160 has a plurality of ribs 169. The respective ribs 169 are arranged with having an interval in the front-rear direction at a part of the frame member 8W positioned at the left of the second platen glass 82. Each rib 169 protrudes upwardly and extends in the left-right direction. An upper end edge 169D of each rib 169 is highest at a left end thereof and is inclined rightward and downward so that a right end thereof reaches the reading surface 82A.

As shown in FIGS. 5 and 8, at the state where the opening/closing unit 9 is located at the closed position, the respective ribs 169 of the guide part 160 pass through the opening 140H, and then the upper end edges 169D of the respective ribs 169 face the second guide surface 122 of the second chute member 120 from below. The guide part 160 is configured to form sixth guide surfaces 166 configured to guide the sheet SH by the upper end edges 169D of the respective ribs 169. The sixth guide surface 166 is an example of the 'guide surface' of this disclosure.

The sixth guide surfaces 166 reach the reading surface 82A with being inclined rightward and downward with having a gap from the second guide surface 122 of the second chute member 120. Also, the sixth guide surfaces 166 extend in the front-rear direction with being intermittent between the respective ribs 169.

At the state where the opening/closing unit 9 is located at the closed position, the sixth guide surfaces 166 define the first inclined part PB11 of the lower path PB1 from below. The sixth guide surfaces 166 extend to be able to abut on the second surface SH2 of the sheet SH passing through the first inclined part PB11 of the lower path PB1 from below and guide the sheet SH from below on the first inclined part PB11 of the lower path PB1. At the state where the opening/closing unit 9 is located at the closed position, the reading sensor 3A faces the sixth guide surfaces 166 from above.

As shown in FIGS. 5, 6, 8, 10 and 11, an inner wall surface 170E is formed by an end edge inclined leftward and downward from a left end portion of the upper end edge 169D of each rib 169. The inner wall surfaces 170E extend in the front-rear direction with being intermittent between the respective ribs 169.

The guide part 160 is formed with an accommodation part 170. The accommodation part 170 is a space defined at the left of the inner wall surfaces 170E and is recessed downwardly from the sixth guide surfaces 166. At the state where the opening/closing unit 9 is located at the closed position, the accommodation part 170 forms an empty space at the lower-left side of the reading surface 83A of the third platen glass 83.

Figure 10:
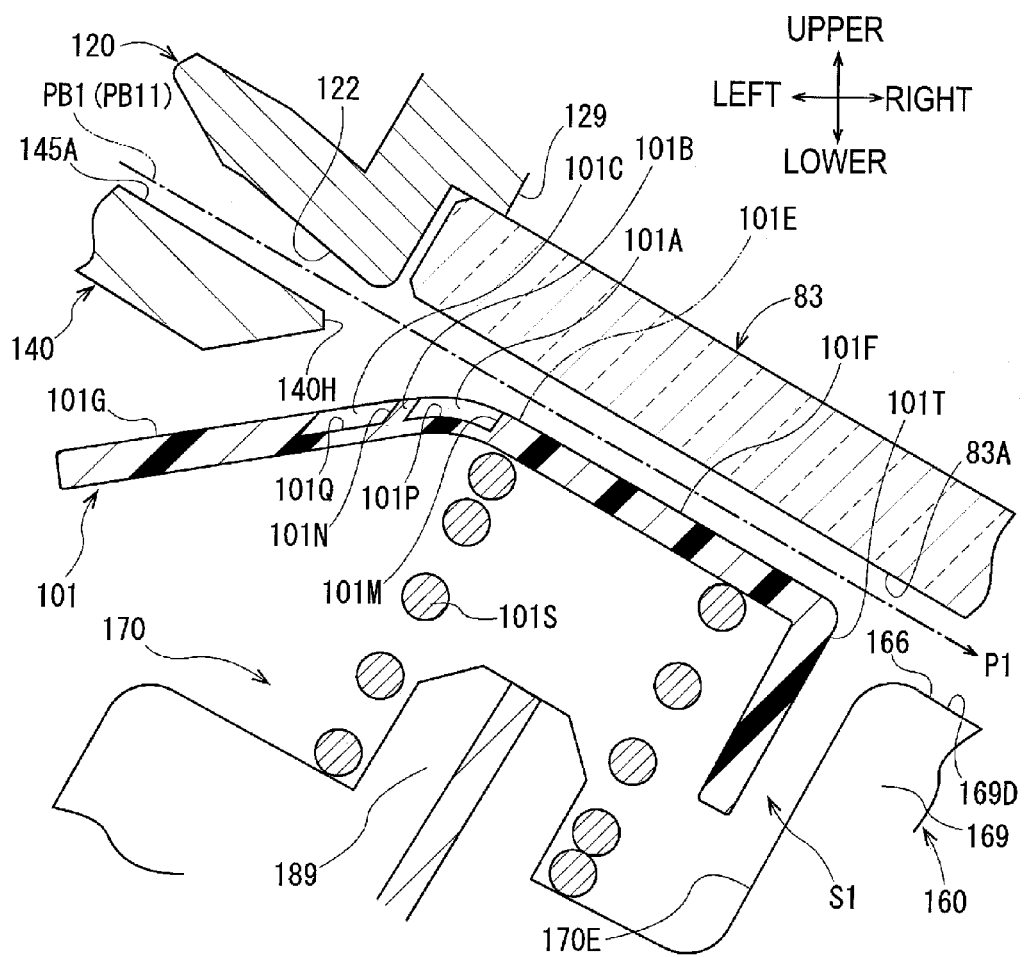

As shown in FIGS. 6 and 11, the accommodation part 170 is provided with a pair of front and rear holding parts 180, 180. As shown in FIGS. 5, 10 and 11, the accommodation part 170 is provided with a spring holding part 189. The respective holding parts 180, 180 and the spring holding part 189 are also formed integrally with the frame member 8W.

As shown in FIG. 11, the respective holding parts 180, 180 protrude upwardly from a front end-side and a rear end-side of the accommodation part 170. The respective holding parts 180, 180 are formed at upper end portions thereof with shaft parts 180A. Both the shaft parts 180A protrude to face each other. The spring holding part 189 protrudes upward and rightward from an intermediate part of the accommodation part 170 in the front-rear direction.

As shown in FIGS. 5, 6 and 10, the first pressing member 101 is detachably accommodated in the accommodation part 170. More specifically, the shaft parts 180A of the respective holding parts 180, 180 shown in FIG. 11 are fitted in both end portions of the first pressing member 101, so that the first pressing member 101 is held in the accommodation part 170. In the meantime, when at least one of the respective holding parts 180, 180 is flexibly deformed to separate the shaft parts 180A from both end portions of the first pressing member 101, the first pressing member 101 can be detached from the respective holding parts 180, 180.

As shown in FIGS. 5, 6 and 8 to 10, the first pressing member 101 is an integrally-molded product made of resin. As the resin material configuring the first pressing member 101, a thermoplastic resin such as a nylon resin, a polycarbonate resin, a polyethylene resin, a polypropylene resin, an ABS resin and the like, and a thermosetting resin such as an epoxy resin, a phenol resin and the like may be used, or reinforced fibers, fillers and the like may be mixed with the resin. Also, the resin material configuring the first pressing member 101 is easy to be charged due to friction with the sheet, unlike to a conductive metal material. Among the resin materials, a resin that is relatively likely to be charged is preferably used as the resin material configuring the first pressing member 101. Also, as the resin material configuring the first pressing member 101, a resin material having favorable wear resistance and sliding characteristic is preferably used.

Figure 9:
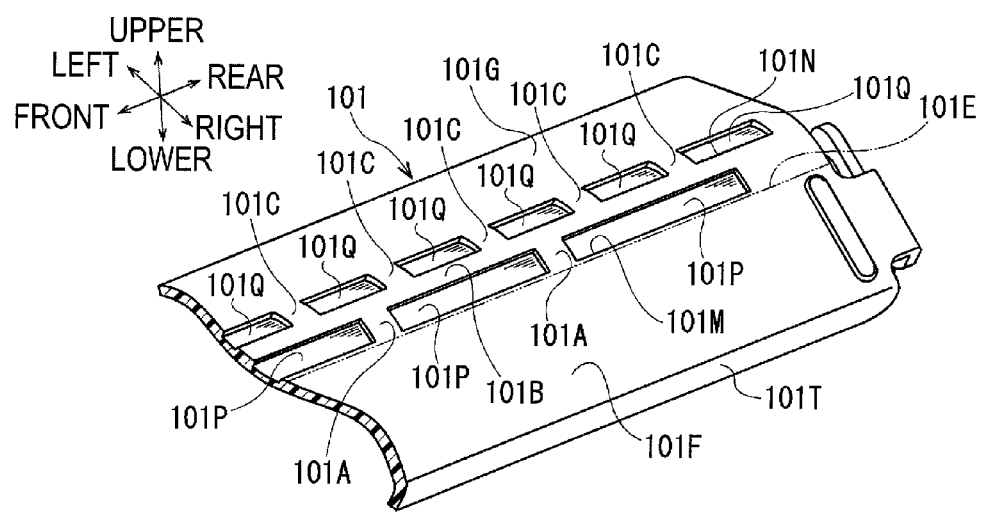
FIG. 9 is a partial perspective view of the first pressing member of the image reading apparatus of the first illustrative embodiment.

As shown in FIGS. 9 and 10, for example, the first pressing member 101 has a flat surface 101F and an inclined surface 101G. The flat surface 101F is configured to face the reading surface 83A from below. The inclined surface 101G connects to an upstream end edge 101E of the flat surface 101F in the conveying direction. The inclined surface 101G is inclined so that it is more separated downwardly from the conveyance path P1 as it proceeds upstream in the conveying direction.

The inclined surface 101G is formed with a plurality of first ribs 101A and a plurality of recess portions 101P. The plurality of recess portions 101P is an example of the 'recess portion' of this disclosure. The first ribs 101A are arranged with having an interval in the front-rear direction and extend in a direction from the left towards the right, which is the conveying direction. An upper surface of each first rib 101A is flush with the inclined surface 101G. Each recess portion 101P is recessed to be separated downwardly from the conveyance path P1 between the respective first ribs 101A. That is, each recess portion 101P is a bottomed rectangular hole recessed from the inclined surface 101G.

[JP0084]

A first wall part 101M is configured by a right end of each recess portion 101P, i.e., an inner wall surface facing upstream in the conveying direction. The first wall parts 101M extend intermittently in the front-rear direction so that they conform to the upstream end edge 101E of the flat surface 101F in the conveying direction from left. That is, the first wall parts 101M are partitioned at the positions at which the first ribs 101A are formed.

The inclined surface 101G is formed with a second rib 101B. The second rib 101B is positioned at the left of the first wall parts 101M, i.e., at the upstream side in the conveying direction. The second rib 101B extends in the front-rear direction and connects to the first ribs 101A so that it intersects with the respective first ribs 101A. The second rib 101B abuts on the respective recess portions 101P from left. An upper surface of the second rib 10B is also flush with the inclined surface 101G.

The inclined surface 101G is formed with a plurality of third ribs 101C and a plurality of recess portions 101Q. The third ribs 101C are arranged with having an interval in the front-rear direction at the left of the first ribs 101A, i.e., at the upstream side in the conveying direction. The third ribs 101C extend in a direction from the left towards the right, which is the conveying direction, and connects to the second rib 101B so that they intersect with the second rib 101B. An upper surface of each third rib 101C is also flush with the inclined surface 101G. Each recess portion 101Q is recessed to be separated downwardly from the conveyance path P1 between the respective third ribs 101C. That is, each recess portion 101Q is a bottomed rectangular hole recessed from the inclined surface 101G.

The second rib 101B abuts on the respective recess portions 101Q from right. A second wall part 101N is configured by a right end of each recess portion 101Q, i.e., an inner wall surface facing upstream in the conveying direction. The second wall parts 101N extend intermittently in the front-rear direction at positions separated leftward from the first wall parts 101M. That is, the second wall parts 101N are partitioned at the positions at which the third ribs 101C are formed.

As shown in FIGS. 8 and 9, the respective first ribs 101A and the respective third ribs 101C are arranged to be out of alignment in the front-rear direction. As shown in FIGS. 8 and 10, at the state where the opening/closing unit 9 is located at the closed position, the opening 140H is positioned just above the respective recess portions 101P and respective recess portions 101Q and enable the respective recess portions 101P and respective recess portions 101Q to face towards the first inclined part PB11 of the lower path PB1.

As shown in FIGS. 5 and 10, a compression coil spring 101S is arranged between the first pressing member 101 and the spring holding part 189. The compression coil spring 101S is configured to urge the first pressing member 101 towards the third platen glass 83 and reading sensor 3A.

The flat surface 101F and the inclined surface 101G of the first pressing member 101 are configured to face the reading surface 83A of the third platen glass 83 and to define the first inclined part PB11 of the lower path PB1 from below, together with the sixth guide surfaces 166. The sixth guide surfaces 166 are adjacent to an end edge 101T of end edges of the first pressing member 101, which is located at a position close to the predetermined reading position, and are inclined downwardly towards the reading surface 82A located at the predetermined reading position-side. At the state where the opening/closing unit 9 is located at the closed position, the flat surface 101F and the inclined surface 101G of the first pressing member 101 extend to be able to abut on the second surface SH2 of the sheet SH passing through the first inclined part PB11 and are configured to guide the sheet SH while urging the sheet SH from below towards the rearing surface 83A on the first inclined part PB11 of the lower path PB1.

As shown in FIGS. 6 and 10, for example, a gap 51 is formed between the inner wall surfaces 170E defining the accommodation part 170 and the end edge 101T of the end edges of the first pressing member 101, which is located at the position close to the predetermined reading position.

As shown in FIGS. 5, 6 and 11, for example, the guide part 160 has a first partition wall 161 and a pair of front and rear partition walls 162, 162. The first partition wall 161 and the respective partition walls 162, 162 are also formed integrally with the frame member 8W.

The first partition wall 161 extends linearly in the front-rear direction with intersecting with the respective ribs 169 and protrudes upwardly. At the intersecting portion of the first partition wall 161 and the respective ribs 169, an upper end edge of the first partition wall 161 is lower than the upper end edges 169D of the respective ribs 169. Thereby, the first partition wall 161 is configured not to interfere with the sheet SH that is being guided by the sixth guide surfaces 166.

As shown in FIG. 11, the second partition walls 162, 162 extend leftward from both end portions of the first partition wall 161 in the front-rear direction, i.e., extend towards the first pressing member 101. The front-side second partition wall 162 connects to the front holding part 180. The rear-side second partition wall 162 connects to the rear holding part 180.

As shown in FIGS. 4 and 5, the conveyor 4 includes the supply roller 41, the separation roller 42 and a separation piece 43 at positions close to the feeder tray 91 of the upper path PA1.

The supply roller 41 and the separation roller 42 are provided at positions facing the first guide surface 111 of the first chute member 110 from above. The separation roller 42 is mounted to a driving shaft 42S extending in the front-rear direction. The separation roller 42 is a roller configured to rotate integrally with the driving shaft 42S.

A holder 42F is swingably supported to the driving shaft 42S. The holder 42F protrudes rightward from the driving shaft 42S. The supply roller 41 is rotatably supported to a right part of the holder 42F. Although not shown, the holder 42F is provided with a transmission gear group (not shown) configured to transmit a driving force from the driving shaft 42S to the supply roller 41.

The separation piece 43 is provided at a position of the first chute member 110 facing the separation roller 42 from below. The separation piece 43 is a plate-shaped member made of a soft material such as rubber and elastomer. The separation piece 43 is attached to an upper surface of a separation piece holder 43F swingably supported to the first chute member 110. An urging spring 43S is arranged between the separation piece holder 43F and the first chute member 110. The urging spring 43S is configured to urge upwardly the separation piece holder 43F, so that the separation piece 43 is pressed by the separation roller 42.

The supply roller 41 is configured to rotate around a shaft center parallel with the driving shaft 42S, to apply a conveying force to the sheet SH supported on the feeder tray 91 and to convey the sheet SH towards the separation roller 42. The separation roller 42 is configured to rotate with contacting the sheet SH delivered from the feeder tray 91 towards the upper path PA1 and to convey the sheet SH towards the curved path PC1. The separation piece 43 is configured to separate the sheet SH being conveyed by the separation roller 42 one by one in cooperation with the separation roller 42.

The conveyor 4 includes a first conveying roller 44, a pinch roller 44P, a second conveying roller 45, a pinch roller 45P, a discharge roller 48 and a pinch roller 48P.

The first conveying roller 44 and the pinch roller 44P are arranged at the left of the separation roller 42 and the separation piece 43 on the upper path PA1, i.e., at the downstream side in the conveying direction. The first conveying roller 44 is positioned at the first guide surface 111-side and the pinch roller 44P is positioned at the fourth guide surface 134-side. The first conveying roller 44 and the pinch roller 44P are configured to nip the sheet SH separated one by one by the separation roller 42 and separation piece 43 and to convey the same towards the curved path PC1.

The second conveying roller 45 and the pinch roller 45P are arranged at the lower portion of the curved path PC1. The second conveying roller 45 and the pinch roller 45P are positioned at the left-upper side of the reading sensor 3A, i.e., at the upstream side in the conveying direction. The second conveying roller 45 is positioned at the lower curved surface 126-side, and the pinch roller 45P is positioned at the fifth guide surface 145A-side.

The second conveying roller 45 and the pinch roller 45P are configured to nip the sheet SH being conveyed by the first conveying roller 44 and the pinch roller 44P and to convey the sheet SH towards the reading sensor 3A facing the first inclined part PB11 from above and towards the reading sensor 3B that is stopped at the predetermined reading position and facing the reference part PB10 from below. At this time, the sheet SH is pressed to the reading surface 83A by the first pressing member 101. Also, the sheet SH is pressed to the reading surface 82A by the second pressing member 102.

The discharge roller 48 and the pinch roller 48P are arranged at the upstream side with respect to the discharge tray 92 in the conveying direction at the right end portion of the second inclined part PB12 of the lower path PB1. The discharge roller 48 is positioned at the third guide surface 123-side, and the pinch roller 48P is positioned at the fifth guide surface 145B-side. The discharge roller 48 and the pinch roller 48P are configured to nip the sheet SH having passed above the reading surface 82A and to discharge the same to the discharge tray 92.

<Image Reading Operation>

According to the image reading apparatus 1, when reading an image of a document supported on the document support surface 81A, the scanning mechanism (not shown) of the reading unit 3 is operated to move the reading sensor 3B in the left-right direction between the lower side of the left end edge of the document support surface 81A and the lower side of the right end edge thereof. Thereby, the reading sensor 3B reads the image of the document supported on the document support surface 81A. Thereafter, the scanning mechanism (not shown) returns the reading sensor 3B having completed the reading to the original position by moving the same from the right end-side in the reading unit 3 to the left end-side.

Also, according to the image reading apparatus 1, when reading the first surface SH1 and second surface SH2 of the sheet SH on the feeder tray 91, the opening/closing unit 9 is located at the closed position. Then, the scanning mechanism (not shown) of the reading unit 3 is operated to stop the reading sensor 3B at the lower predetermined reading position of the reading surface 82A. The reading sensor 3B faces the reference part PB10 of the lower path PB1 at the predetermined reading position in a downstream side from the reading sensor 3A in the conveying direction.

When the conveyor 4 sequentially conveys the sheet SH on the feeder tray 91 along the conveyance path P1, the sheet SH passes through the upper path PA1 and the curved path PC1 and reaches the lower path PB1. Then, the reading sensor 3A reads an image of the first surface SH1 of the sheet SH passing through the first inclined part PB11, through the reading surface 83A. Then, the reading sensor 3B stopped at the predetermined reading position reads an image of the second surface SH2 of the sheet SH passing through the reference part PB10, through the reading surface 82A. The sheet SH, of which images have been read, passes through the second inclined part PB12 and is then discharged to the discharge tray 92 by the discharge roller 48 and pinch roller 48P.

<Operational Effects>

According to the image reading apparatus 1 of the first illustrative embodiment, as shown in FIGS. 5 and 10, the first pressing member 101 is easy to be charged due to the friction between the sheet SH being conveyed by the conveyor 4 and the first pressing member 101 made of resin. Therefore, when the dusts such as paper sheets are attached to the sheet SH being conveyed or when the dusts such as dirt are introduced to the conveyance path P1, the dusts are adsorbed to the charged first pressing member 101. Therefore, according to the image reading apparatus 1, it is possible to suppress the dusts from being attached to the reading surface 83A facing the first pressing member 101 and to the reading surface 82A positioned at a downstream side with respect to the first pressing member 101 in the conveying direction.

Also, according to the image reading apparatus 1, as shown in FIGS. 4 and 5, the sheet SH being conveyed by the conveyor 4 is contacted to the second pressing member 102 made of metal, so that it is possible to enable the charges to flow from the sheet SH towards the ground via the second pressing member 102 and the earth wiring 102W. Therefore, since it is possible to neutralize the sheet SH in the image reading apparatus 1, the sheet SH being conveyed by the conveyor 4 is discharged to the discharge tray 92 with suppressing from being charged. Therefore, according to the image reading apparatus 1, a situation where the discharged sheet SH sticks to the lower surface of the first chute member 110 positioned above the discharge tray 92, to a downwardly facing surface of the opened cover 9C or to the sheet SH discharged in advance is difficult to occur.

Therefore, according to the image reading apparatus 1 of the first illustrative embodiment, it is possible to suppress deterioration of image reading qualities of the reading sensors 3A, 3B, which is caused due to the dusts such as paper dusts, while suppressing a discharge failure of the sheet SH caused due to static electricity.

Also, according to the image reading apparatus 1, as shown in FIG. 10, the first pressing member 101 is held in the accommodation part 170 recessed downwardly from the sixth guide surfaces 166 and defines the lower path PB1 from below, together with the sixth guide surfaces 166. Therefore, according to the image reading apparatus 1, when the dusts adsorbed to the first pressing member 101 are dropped, it is possible to collect the dusts into the accommodation part 170.

Further, according to the image reading apparatus 1, as shown in FIGS. 9 and 10, it is possible to catch the dusts to be attached to the inclined surface 101G of the first pressing member 101 in front of the flat surface 101F by the plurality of recess portions 101P formed on the inclined surface 101G of the first pressing member 101 and the first wall parts 101M.

Also, according to the image reading apparatus 1, when a tip of the sheet SH being conveyed by the conveyor 4 is guided by the inclined surface 101G of the first pressing member 101, it is guided towards the flat surface 101F with abutting on the respective first ribs 101A, which are flush with the inclined surface 101G. Therefore, according to the image reading apparatus 1, it is possible to suppress the tip of the sheet SH from being caught at the first wall parts 101M of the recess portions 101P. That is, even when the inclined surface 101G of the first pressing member 101 is formed with the recess portions 101P, a situation is not caused as regards the conveyance of the sheet SH being conveyed along the first pressing member 101.

Further, according to the image reading apparatus 1, it is possible to catch the dusts to be attached to the inclined surface 101G of the first pressing member 101 in front of the second rib 101B by the plurality of recess portions 101Q formed on the inclined surface 101G of the first pressing member 101 and the second wall parts 101N.

Also, according to the image reading apparatus 1, when the tip of the sheet SH being conveyed by the conveyor 4 is guided by the inclined surface 101G of the first pressing member 101, it is guided towards the flat surface 101F with abutting on the respective third ribs 101C, which are flush with the inclined surface 101G. Therefore, according to the image reading apparatus 1, it is possible to suppress the tip of the sheet SH from being be caught at the second wall parts 101N. That is, even when the inclined surface 101G of the first pressing member 101 is formed with the recess portions 101Q, a situation where the conveyance of the sheet SH being conveyed along the first pressing member 101 do not occur. Also, according to the image reading apparatus 1, the respective first ribs 101A and the respective third ribs 101C are arranged to be out of alignment in the front-rear direction, so that it is possible to catch the dusts over an entire range in the longitudinal direction of the pressing member by the cooperation of the first wall parts 101M and second wall parts 101N extending intermittently in the front-rear direction.

Further, as shown in FIGS. 5, 6, 8 and 10, according to the image reading apparatus 1, the gap 51 is formed between the inner wall surfaces 170E defining the accommodation part 170 and the end edge 101T of the end edges of the first pressing member 101, which is located at the position close to the predetermined reading position. Therefore, according to the image reading apparatus 1, the dusts adsorbed to the first pressing member 101 can be easily dropped through the gap 51 between the inner wall surfaces 170E and the end edge 101E of the first pressing member 101. Therefore, according to the image reading apparatus 1, it is possible to securely collect the dusts adsorbed to the first pressing member 101 into the accommodation part 170.

Also, as shown in FIGS. 6 and 8, according to the image reading apparatus 1, even when the dusts collected in the accommodation part 170 intend to pass through between the respective ribs 169, the dusts are blocked by the first partition wall 161 extending in the front-rear direction with intersecting with the respective ribs 169 and protruding upwardly.

Further, as shown in FIGS. 6 and 8, according to the image reading apparatus 1, even when the dusts blocked by the first partition wall 161 intend to be discharged from both end portions of the first partition wall 161 in the front-rear direction towards an outside of the accommodation part 170, the dusts may be surrounded by the respective second partition walls 162, 162.

Also, as shown in FIGS. 6 and 11, according to the image reading apparatus 1, since the pair of front and rear holding parts 180, 180 detachably holds the first pressing member 101, it is possible to easily replace the first pressing member 101. Further, as shown in FIG. 11, according to the image reading apparatus 1, it is possible to easily clean the periphery of the accommodation part 170 by detaching the first pressing member 101 at the state where the opening/closing unit 9 is located at the opened position. Also, according to the image reading apparatus 1, it is possible to easily remove the adsorbed dusts from the detached first pressing member 101.

Second Illustrative Embodiment

Figure 12:
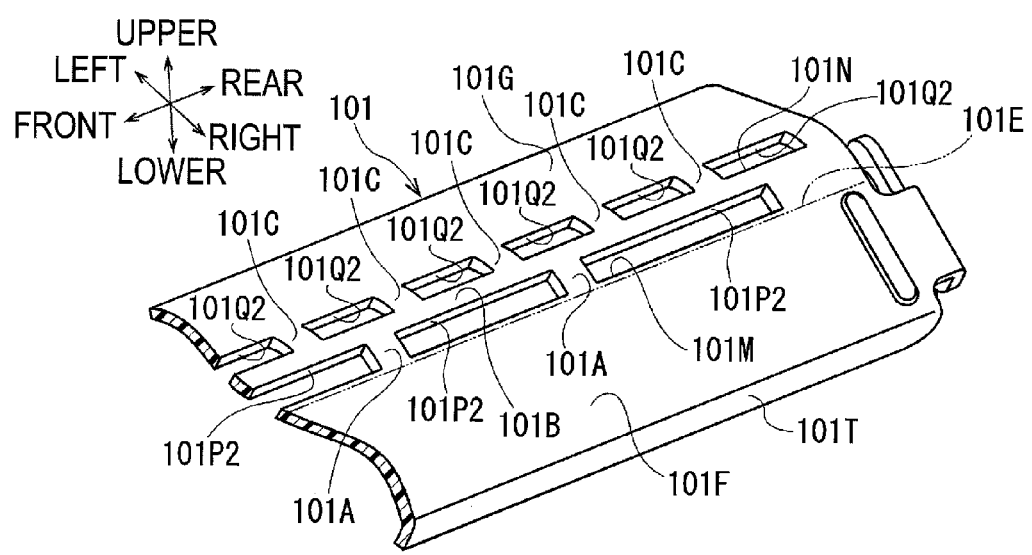
FIG. 12 is a partial perspective view of a first pressing member of an image reading apparatus according to a second illustrative embodiment.
Figure 13:
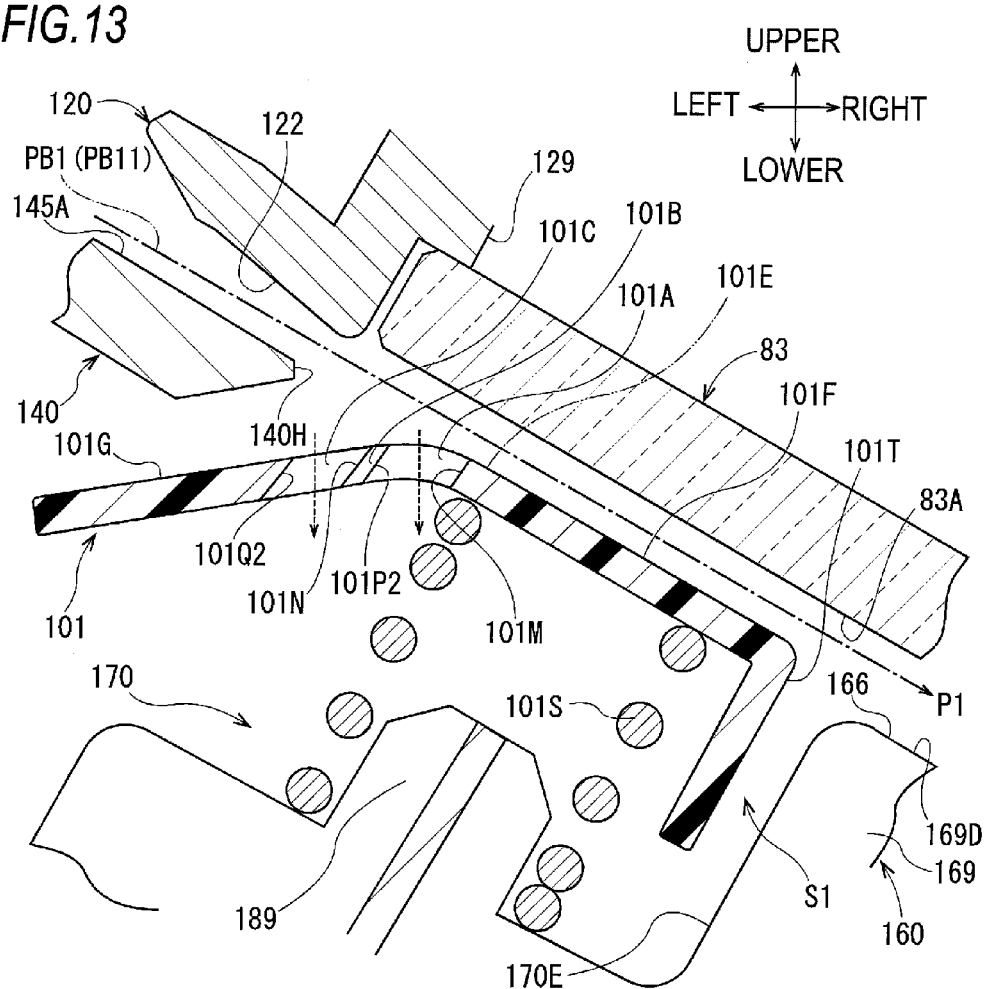

In the image reading apparatus 1 of the first illustrative embodiment, the recess portions 101P, 101Q formed on the inclined surface 101G are the bottomed holes. In an image reading apparatus of a second illustrative embodiment, as shown in FIGS. 12 and 13, recess portions 101P2, 101Q2 are used instead of the recess portions 101P, 101Q. The other configurations of the second illustrative embodiment are the same as the first illustrative embodiment. Therefore, the same configurations as the first illustrative embodiment are denoted with the same reference numerals and the descriptions thereof are omitted or simplified.

The recess portions 101P2, 101Q2 are the same as the recess portions 101P, 101Q, except that the bottoms are removed. That is, the inclined surface 101G is formed with the recess portions 101P2, 101Q2, which are through-holes.

In the image reading apparatus of the second illustrative embodiment, like the image reading apparatus 1 of the first illustrative embodiment, it is possible to suppress the deterioration of the image reading qualities of the reading sensors 3A, 3B, which is caused due to the dusts such as paper dusts, while suppressing the discharge failure of the sheet SH caused due to the static electricity.

Particularly, according to this image reading apparatus, it is possible to drop the dusts, which are adsorbed to the inclined surface 101G of the first pressing member 101 defining the lower path PB1 from below, from the first pressing member 101 via the recess portions 101P2, 101Q2.

Although this disclosure has been described with reference to the first and second illustrative embodiments, this disclosure is not limited to the first and second illustrative embodiments and can be appropriately changed without departing from the gist thereof.

For example, the shapes and numbers of the first wall parts, the second wall parts, the first ribs, the second rib, the third ribs, the recess portions and the like formed on the inclined surface are not limited to the configurations of the illustrative embodiments and can be appropriately selected.

This disclosure can be applied to an image reading apparatus, a multifunctional peripheral and the like.

What is claimed is:

1. An image reading apparatus comprising:
a first unit, which includes a supporting platen capable of supporting a read object;
a second unit, which is provided to the first unit and is pivotable about an axis extending a first direction to be moved between an opened position and a closed position, wherein in a case where the second unit is located in the opened position, the supporting platen is exposed, and in a case where the second unit is located in the closed position, the supporting platen is covered;
a conveyor, which is provided to the second unit and configured to convey a sheet in a conveying direction along a conveyance path;
a first image sensor, which is provided to the second unit and which is configured to read an image of a first surface of the sheet conveyed by the conveyor, through a first reading surface along the conveyance path;
a second image sensor, which is provided to the first unit and is configured to read an image of a second surface opposite to the first surface of the sheet conveyed by the conveyor, through a second reading surface along the conveyance path;
a first facing member, which is configured to face the first reading surface and to form the conveyance path between the first reading surface; and
a second facing member, which configured to face the second reading surface and to form the conveyance path between the second reading surface;
wherein as the second unit moves between the opened position and the closed position, the second facing member moves,
wherein in a case where the second unit is located at the opened position, the first facing member upwardly protrudes from an upper face of the first unit, and
wherein a groove is formed at a facing surface, which faces the first reading surface, of the first facing member and extends in a second direction perpendicular to the first direction.

2. The image reading apparatus according to claim 1, wherein the groove is formed at an upstream side of an intermediate point of a facing area, in which the first facing member faces the first reading surface, in the conveyance direction.

3. The image reading apparatus according to claim 1, wherein the first image sensor faces the conveyance path from above,
wherein the first reading surface defines the conveyance path from above,
wherein the first facing member defines the conveyance path from below,
wherein the second image sensor faces the conveyance path from below,
wherein the second reading surface defines the conveyance path from below, and
wherein the second facing member defines the conveyance path from above.

4. The image reading apparatus according to claim 3, wherein the conveyance path comprises an upper path, a lower path positioned at a lower side with respect to the upper path and a curved path connecting the upper path and the lower path each other,
wherein the conveyor is configured to convey the sheet from the upper path to the lower path via the curved path,
wherein the first image sensor faces the lower path from above,
wherein the first reading surface defines the lower path from above,
wherein the first facing member is accommodated in an accommodation part recessed downwardly from a guide surface defining the lower path from below and defines the lower path from below together with the guide surface,
wherein the second image sensor faces the lower path from below,
wherein the second reading surface defines the lower path from below, and
wherein the second facing member defines the lower path from above.

5. The image reading apparatus according to claim 1, wherein the first reading surface is inclined with respect to the second reading surface, and
wherein the facing surface of the first facing member is parallel to the first reading surface and is inclined with respect to the second reading surface.

6. The image reading apparatus according to claim 1, wherein the first facing member is made of resin.

7. The image reading apparatus according to claim 1, wherein the first facing member is located between a peripheral edge of the supporting platen and an end edge, which extends along the second direction, of the first unit.

8. The image reading apparatus according to claim 1, wherein the groove is formed to intermittently extend in the first direction.

9. The image reading apparatus according to claim 1, wherein the second reading surface is a part of the supporting platen.

* * * * *